(No Model.)

J. C. BAYLES.
HUB AND SPIGOT COUPLING FOR SHEET METAL PIPES.

No. 390,152. Patented Sept. 25, 1888.

Attest:
L. Lee.
H. J. Miller

Inventor.
James C. Bayles, per
Crane & Miller, Attys.

UNITED STATES PATENT OFFICE.

JAMES C. BAYLES, OF NEW YORK, N. Y.

HUB AND SPIGOT COUPLING FOR SHEET-METAL PIPES.

SPECIFICATION forming part of Letters Patent No. 390,152, dated September 25, 1888.

Application filed September 28, 1887. Serial No. 250,887. (No model.)

*To all whom it may concern:*

Be it known that I, JAMES C. BAYLES, a citizen of the United States, residing in the city, county, and State of New York, have invented certain new and useful Improvements in Hub and Spigot Couplings for Sheet-Metal Pipes, fully described and represented in the following specification and the accompanying drawings, forming a part of the same.

The object of this invention is to attach a spigot to thin sheet-metal pipes, so that the same may be readily connected to elbows, T's, and branches provided with the ordinary hub, in the socket of which the spigot may be secured by a calked lead joint in the usual manner.

If it were necessary to provide an ordinary screwed wrought-iron pipe with a spigot, it could readily be done by forming a thread within the spigot and screwing the same upon the end of the pipe; but in the case of thin sheet-metal pipes a thread cannot be employed, and the spigot requires attachment in some other manner, which is effected in my invention by dividing the spigot into longitudinal sections and clamping the same upon the end of the thin iron pipe by a collar fitted over the sections. The subsequent operation of calking the packing around the spigot within the hub serves to press the sections closely upon the pipe, and to thus secure them firmly in place independently of the collar. Such sheet-metal pipes may thus be conveniently attached together at different angles, or may be united to cast-iron pipes formed with hubs, as is common with pipes of that material.

Figure 1:
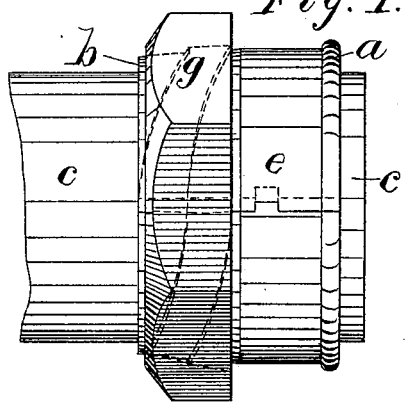
Figure 2:
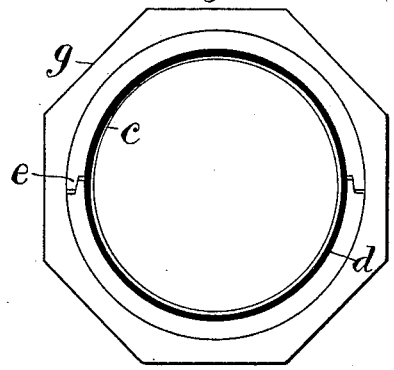
Figure 3:
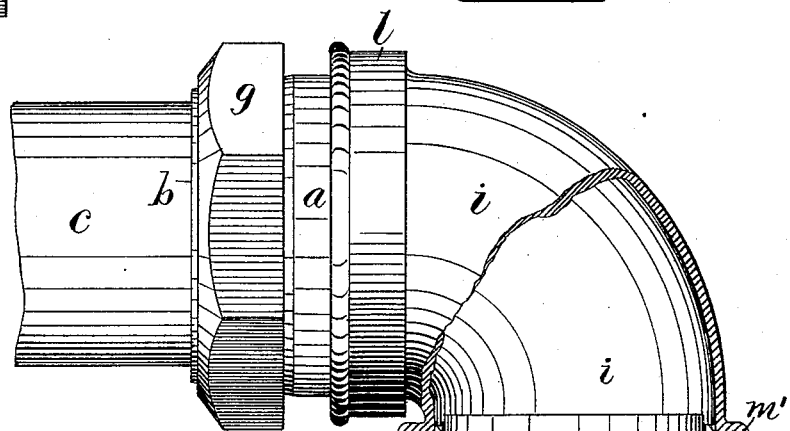
Figure 4:
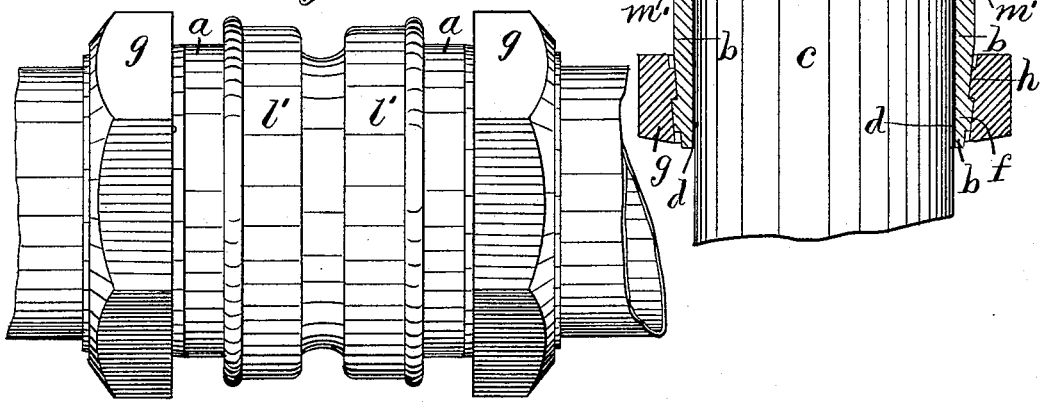

My invention will be understood by reference to the annexed drawings, in which Figure 1 shows an external view of a pipe end having a spigot secured thereon. Fig. 2 is an end view of the same. Fig. 3 is a view, partly in section where hatched, of an elbow having two such pipes and spigots attached thereto; and Fig. 4 is a view of two such pipes and spigots attached together by a hub coupling, which is shown in section.

The invention consists in a spigot, $a$, formed upon the end of a cylindrical sleeve, $b$, which is divided into sections longitudinally and clamped upon the sheet-metal pipe $c$ by any suitable means, with a packing, $d$, of fibrous or pasty material interposed between the spigot and pipe to prevent leakage at the longitudinal divisions $e$.

The spigot consists of the end provided with annular bead $a$, and the sleeve is shown tapered externally at the opposite end and provided with a screw-thread, $f$; and a collar, $g$, tapered internally, is also provided with a screw-thread, $h$, so that when screwed upon the sections of the sleeve it operates, by the inclination of the bearing-surfaces, to clamp the sleeve firmly upon the pipe and upon the interposed packing. The spigot is shown divided longitudinally into two sections, the edges of which are shown rabbeted to hold them into the proper relation and to permit their contraction upon the pipe, and one is provided with a tongue, $j$, and the other with a recess, $k$, in the edge of the rabbet to prevent longitudinal movement of the sections upon one another. The pipe, being thus provided with a rigid spigot, is adapted for connection with a hub of any suitable size by calking a lead packing around the spigot within the socket of the hub in the usual manner. As the packing is restrained by the hub from expanding outward, its pressure upon the sections of the spigot tends to force them firmly into contact with the pipe and to hold the same thereon with great security, independently of the collar or other fastening applied to their outer ends.

In Fig. 3 an elbow, $i$, is shown with one of its hubs $l$ in section, the socket within such hub being filled with the usual hemp and lead packings, $m$ and $m'$.

In Fig. 4 the hub-coupling $n$ is shown with the pipe ends $o$ and their respective spigots $a$ fitted within the hubs $l'$ at its opposite ends, and secured therein by the usual packings.

It is obvious that if a sectional hub were applied to a pipe the strain of calking a spigot therein would tend to expand the hub and to separate its respective sections, so as to induce leakage at the longitudinal divisions; and my improvement is thus more particularly adapted for applying to the ends of metallic pipes sectional spigots, which may not only be clamped tightly thereon by reason of their longitudinal divisions, but which would be still more firmly compressed upon the pipe by the pressure of the packings m m' when secured within a rigid hub or socket. The use of such hubs upon cast-iron and earthen pipes is so general that the construction which I have devised for securing a spigot upon the end of a smooth metallic pipe affords the means of readily connecting such pipes with any other system of pipes provided with hubs and spigots, as the sectional spigot is adapted for coupling directly with any fitting that is provided with a hub, or with any other spigot by the intervention of a hub-coupling such as is shown in Fig. 4.

The essential part of my invention is the combination, with a smooth cylindrical pipe, of a spigot formed in longitudinal sections and clamped thereon.

My invention is particularly applicable to thin sheet-iron and steel pipes formed with a spirally-welded seam, in which pipes the fiber of the metal is extended around the pipe, and great strength is secured with very little thickness of metal. Such pipes may be readily made of larger dimensions than lap-welded tubes, and are therefore adapted for gas and water mains, in which the connections are commonly made by hub and spigot joints. My invention thus affords the means of connecting such pipes of large diameter with the cast-iron pipes already in use, and with the T's, elbows, and branches of cast-iron already for sale in the market.

I am aware that it has been proposed—as in United States Patent No. 144,663, dated November 18, 1873—to connect a coupling-flange with the end of a straight pipe by clamping a split flange thereon; and I do not therefore claim, broadly, the attachment of a connecting-piece, coupling, or flange by forming the same in sections and clamping such sections upon the end of the pipe.

I am also aware that sectional couplings have been clamped upon pipe ends by tapering the ends of the sections and screwing a threaded collar over the same; and I do not therefore claim such a device as my own invention.

My invention consists, specifically, in the connection of spigot-sections with the end of a pipe in such manner that the packing inserted within the hub about such sections may serve to press the same upon the pipe to hold them thereto when in use.

The formation of the spigot upon a sleeve with tapering end furnishes a very convenient means to clamp the sections of the spigot together with great power, and a collar may be fitted upon such tapering ends by other means than that shown herein, as by making the collar larger than the sleeve and driving wedges therein, as is shown in my patent application, Serial No. 250,888, for split coupling for pipe-joints, filed September 28, 1887.

Having thus set forth my invention, what I claim herein is—

1. The combination, with a cylindrical pipe end, of a spigot formed in longitudinal sections, a yielding packing inserted between the pipe and the sections to pack the longitudinal joints of the latter, and a collar fitted over the sections to clamp the same upon the pipe end, substantially as herein set forth.

2. The combination, with a cylindrical pipe end, of a spigot formed in longitudinal sections, a yielding packing inserted between the pipe and the sections to pack the longitudinal joints of the latter, a collar fitted over the sections to clamp the same upon the pipe end, and a hub fitted to the spigot with a packing calked within the same and operating to press the sections upon the pipe end, substantially as herein set forth.

In testimony whereof I have hereunto set my hand in the presence of two subscribing witnesses.

JAMES C. BAYLES.

Witnesses:
WM. S. CHURCH,
THOS. S. CRANE.